Figure 1:
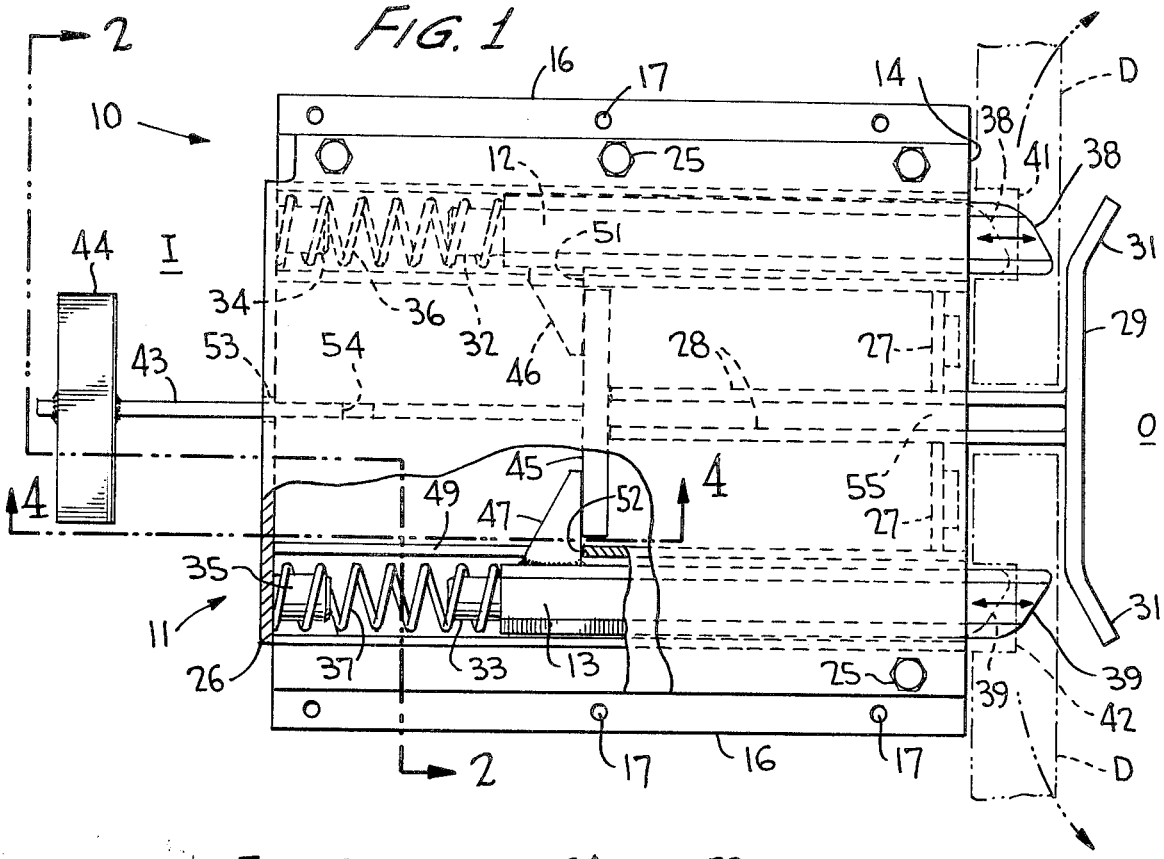
Figure 2:
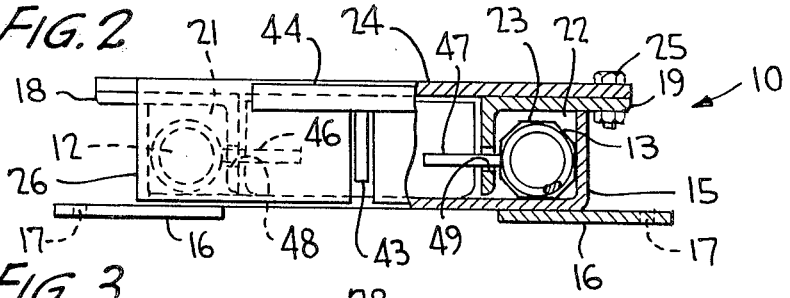
Figure 3:
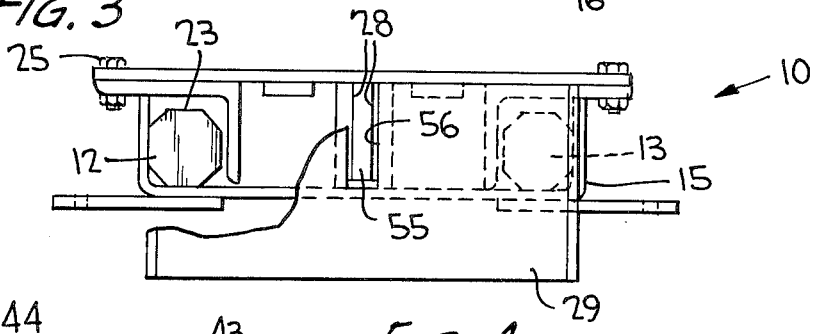
Figure 4:
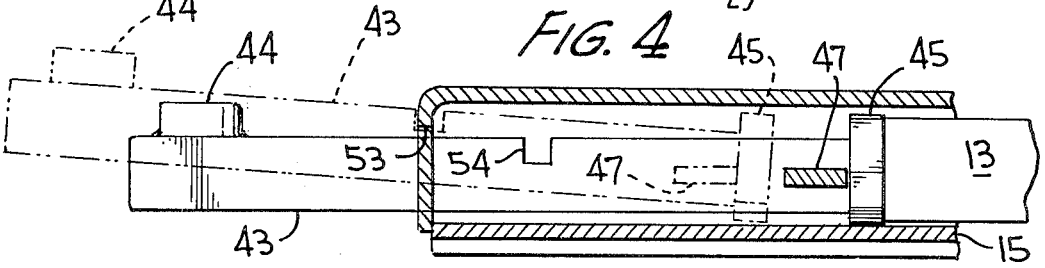

United States Defensive Publication [19] (H) [11] T978,006

Carman et al. [43] Jan. 2, 1979

[54] SPRING PROJECTED BOLT LATCHING DEVICE

[76] Inventors: Richard W. Carman, 502 Four Mile Rd. #204, Alexandria, Va. 22308; Kenneth E. Riggs, 7508 Berwick Ct., Alexandria, Va. 22310; Percy R. Seward, 12823 Epping Ter., Silver Spring, Md. 20906; Thomas R. Smith, 15 W. Maple St., Alexandria, Va. 22301

[21] Appl. No.: 849,714

[22] Filed: Nov. 8, 1977

[51] Int. Cl.[2] ..... E05C 1/06

[52] U.S. Cl. ..... 292/41; 292/174; 292/DIG. 46

[57] ABSTRACT

A latching device includes a pair of spring projected latch bolts located within a housing and movable outwardly of one end wall thereof for engagement with detents of a pair of doors to be latched in a closed position. A rod extending at one end thereof outwardly of an opposite wall of the housing has a handle at such one end and a transverse bar at an opposite end which engages a pair of lugs provided on the bolts, so that the doors may be unlatched as the handle is pulled from inside the housing so as to move the bar toward the opposite end wall of the housing thereby effecting bolt retraction. A notch is provided on the rod for engagement with a portion of the opposite end wall of the housing for maintaining the bolts in an unlatched position, and bolt guides are provided in the housing in the form of passageways of rectangular cross-section for preventing the bolts, having flat outer surfaces lying parallel to the walls of the passageways, from rotating about their central axes. Also, the bolts may be retracted from outside the housing as an elongated member is inserted through the one end of the housing to move the transverse bar.

4 Claims, 1 Sheet Drawing,

10 Pages Specification

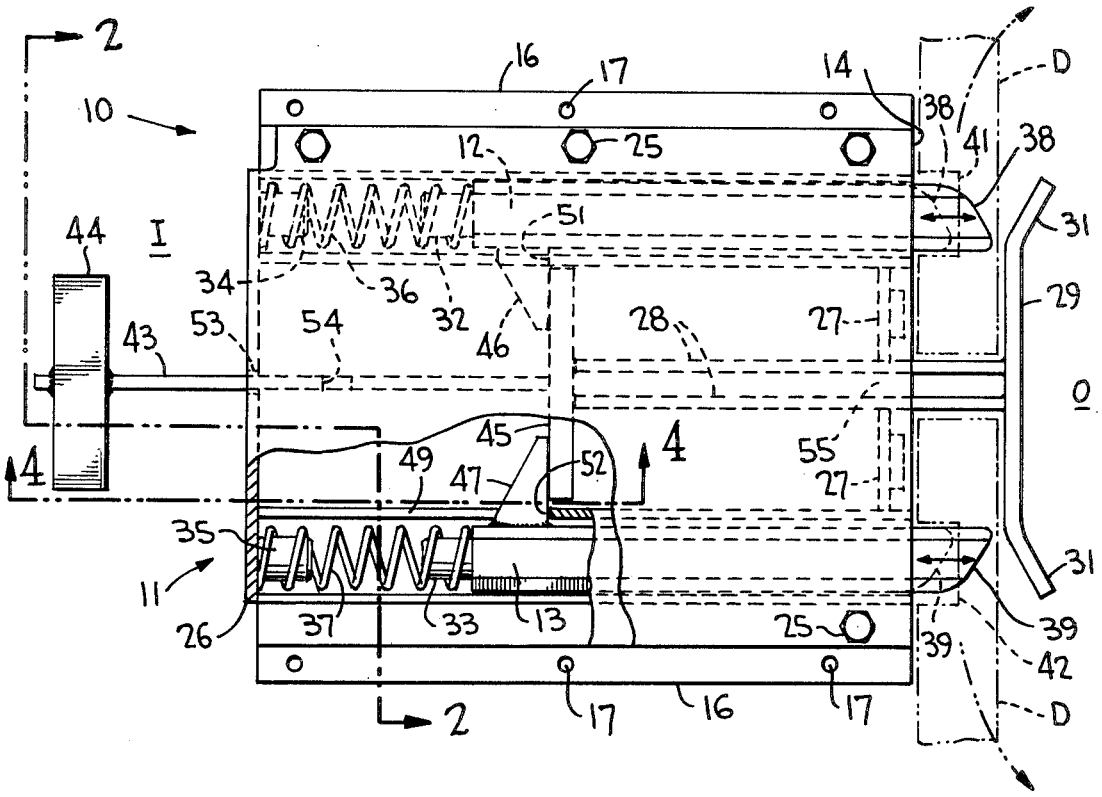

The file of this unexamined application may be inspected and copies thereof may be purchased (849 O.G. 1221, Apr. 9, 1968).